Figure 1:
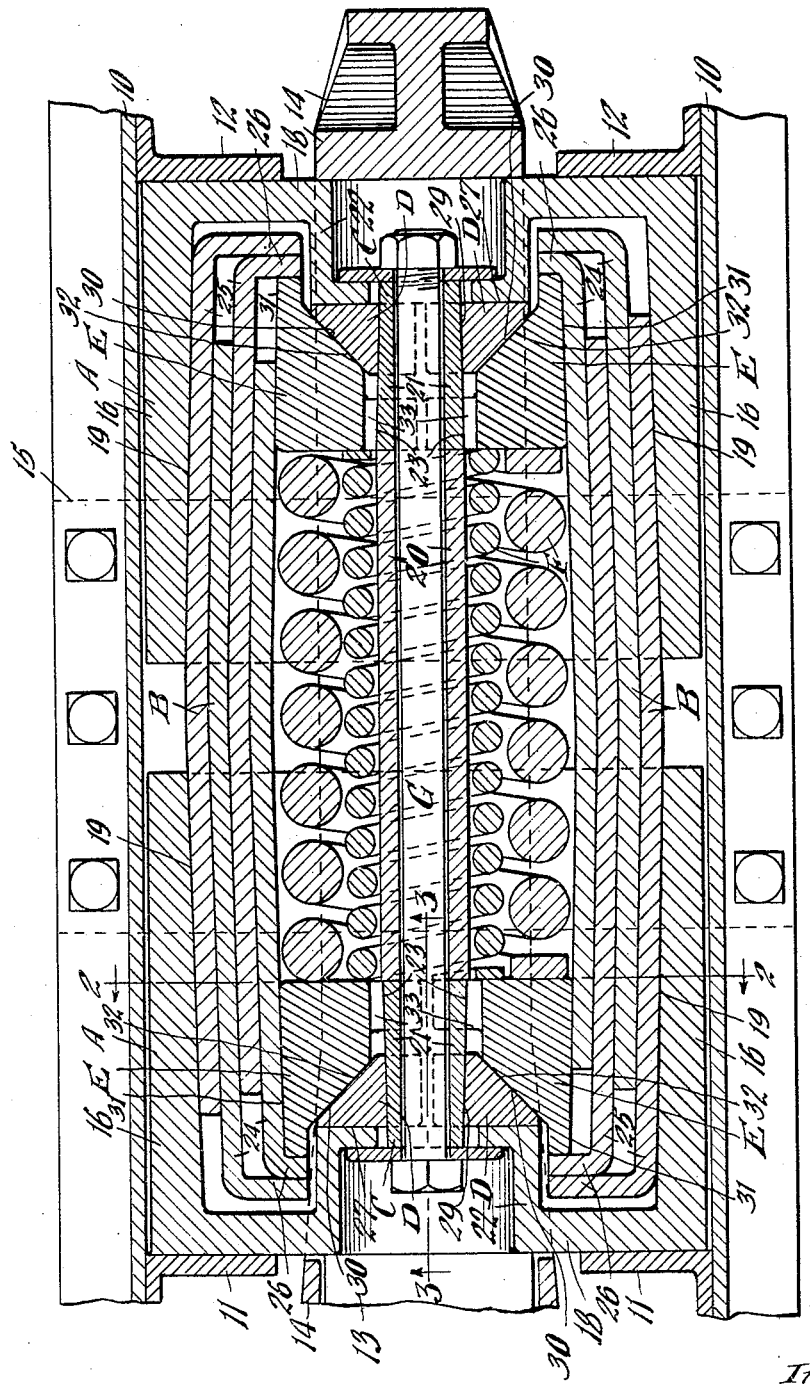

May 3, 1932. J. F. O'CONNOR 1,856,422
FRICTION SHOCK ABSORBING MECHANISM
Filed April 14, 1928 2 Sheets-Sheet 1

Witness
Wm. Geiger

Inventor
John F. O'Connor
By Joseph Harris
His Atty.

May 3, 1932.  J. F. O'CONNOR  1,856,422
FRICTION SHOCK ABSORBING MECHANISM
Filed April 14, 1928  2 Sheets-Sheet 2
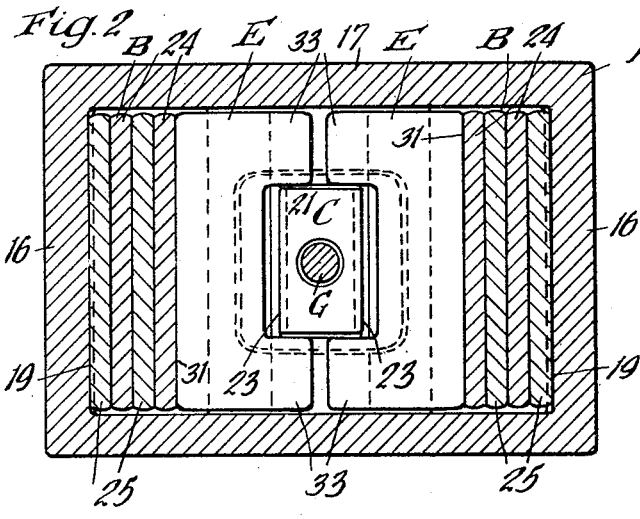
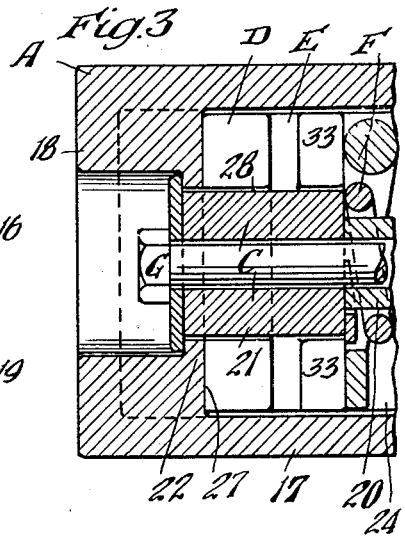
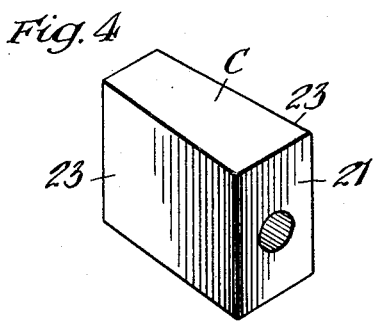
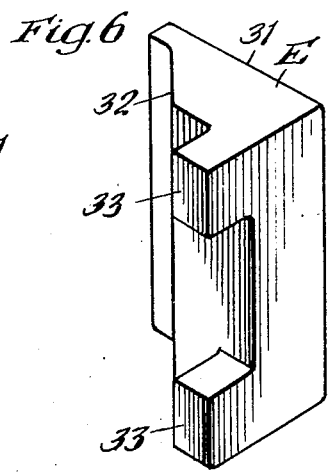
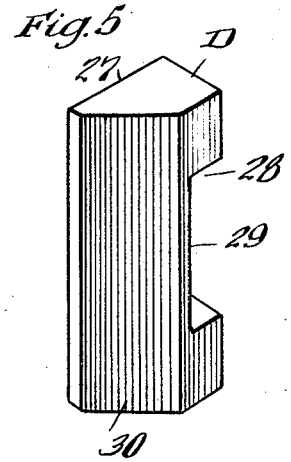
Inventor
John F. O'Connor
By Joseph Harris
His Atty.
Witness
Wm. Geiger Patented May 3, 1932

1,856,422

UNITED STATES PATENT OFFICE

JOHN F. O'CONNOR, OF CHICAGO, ILLINOIS, ASSIGNOR TO W. H. MINER, INC., OF CHICAGO, ILLINOIS, A CORPORATION OF DELAWARE

FRICTION SHOCK ABSORBING MECHANISM

Application filed April 14, 1928. Serial No. 269,932.

This invention relates to improvements in friction shock absorbing mechanisms.

One object of the invention is to provide a friction shock absorbing mechanism especially adapted for railway draft riggings, having high frictional capacity produced by a plurality of relatively movable intercalated friction members, including friction wedge elements, friction shoes, friction shells, a friction post, and a main spring resistance opposing movement of the friction plates and members, wherein the post is disposed centrally of the mechanism, thereby providing a maximum amount of spring space to accommodate the main spring resistance, thus permitting the use of a high capacity spring surrounding the friction post.

Another object of the invention is to provide, in a friction shock absorbing mechanism of the character indicated, including relatively movable friction plates, a central friction post, a friction shell enclosing the plates, and friction wedge elements cooperating with the plates and post, differential action to provide high capacity, wherein the differential action is effected by providing friction surfaces on the post and shell which are inclined with respect to the direction of the applied force.

A further object of the invention is to provide in a friction shock absorbing mechanism of the double-ended type, including relatively movable friction plates and friction wedge means cooperating with the plates, a central friction post cooperating with the friction wedge means, wherein the post has the friction surfaces thereof carried by detachable end sections to provide for renewal of the friction surfaces by substituting new end sections for end sections which have become worn.

Other and further objects of the invention will more clearly appear from the description and claims hereinafter following.

In the drawings, forming a part of this specification, Figure 1 is a horizontal, longitudinal sectional view through a portion of a draft rigging of a railway car, illustrating my improvements in connection therewith. Figure 2 is a vertical, transverse sectional view, corresponding substantially to the line 2—2 of Figure 1. Figure 3 is a longitudinal, vertical sectional view of the front end portion of the shock absorbing mechanism illustrated in Figure 1 and corresponding substantially to the line 3—3 of said figure. And Figures 4, 5, and 6 are detailed, perspective views, respectively, of one of the end sections of the friction post, one of the friction shoes and one of the wedge friction blocks employed in connection with my improved mechanism.

In said drawings, 10—10 indicate channel-shaped center or draft sills of a railway car underframe, to the inner sides of which is secured the usual front and rear stop lugs 11—11 and 12—12. The inner end portion of the drawbar is designated by 13, to which is operatively connected the yoke 14 of well known form. My improved shock absorbing mechanism, which is of the double-ended friction type, is disposed within the yoke and the yoke in turn is supported by a detachable saddle plate 15, fixed to the lower flanges of the draft sills in any suitable manner, the same being shown as secured by bolts.

My improved friction shock absorbing mechanism proper comprises, broadly, front and rear friction shells or casings A—A, two groups of friction plates B—B, a central friction post C, front and rear pairs of wedge friction blocks D—D, front and rear pairs of friction shoes E—E, a main spring resistance F, and a retainer bolt G.

The front and rear friction casings or shells A are each in the form of a substantially rectangular boxlike member, having longitudinally disposed spaced side walls 16—16, horizontally disposed, spaced top and bottom walls 17—17, and a vertical outer end wall 18. The end wall 18 of each shell A cooperates with the corresponding stop lugs of the draft sills in the manner of the usual main follower. The side walls 16 of each friction casing A are provided with opposed, interior friction surfaces 19—19, diverging inwardly of the mechanism.

The friction post C is disposed centrally of the mechanism and includes a central column member 20 and front and rear end members 21—21. The column member 20 and the end members 21 of the post C are provided with longitudinally disposed, aligned openings, adapted to accommodate the retainer bolt G. The retainer bolt G extends entirely through the central column and end sections of the post and has the opposite ends thereof anchored to the respective casings A. As shown, each casing A is provided with an inwardly extending hollow boss 22 on the end wall 18 thereof, which receives the corresponding end of the retainer bolt.

As shown in Figure 1, the head of the bolt is disposed in the boss of the front follower casing A and a retaining disc is interposed between the head of the bolt and the inner wall of the boss. The nut of the bolt is disposed in the hollow boss of the rear friction casing A and a disc is also interposed between the nut and the inner wall of the hollow boss 22 of this shell.

It will be evident that the retainer bolt thus holds the parts of the friction post assembled. The end sections 21 of the post extend through openings in the bosses 22 of the two casings A and have their outer ends directly engaging the retaining discs. The retaining discs are thus tightly clamped to the sections of the post and cooperate with the bosses 22 of the casings A to limit outward separation of said casings.

The end sections 21 of the friction post C are each provided with a pair of friction surfaces 23—23 on the opposite sides thereof, which are inclined with respect to the longitudinal axis of the mechanism and, as shown, preferably diverge inwardly of the mechanism.

The friction plates B are arranged in two groups at opposite sides of the mechanism, each group comprising two sets of plates, the plates of one of said sets being indicated by 24—24 and the plates of the other set being indicated by 25—25. As shown, one of the plates 24 of each group is disposed innermost, while one of the plates 25 of said group is disposed outermost and cooperates with the friction surfaces 19—19 of the friction casings or shells A at the same side of the mechanism.

As clearly illustrated in Figure 1, the friction plates 24 and 25 have the opposite end portions thereof inclined inwardly with respect to the longitudinal axis of the mechanism, so as to properly cooperate with the inwardly diverging friction surfaces of the front and rear friction shells.

Each of the plates 24 and 25 of the two groups is provided with an inturned flange section 26 at one end thereof. The plates of each group are so arranged that the flanges of the set of plates 24 are disposed at one end of the mechanism, while the flanges of the plates 25 are disposed at the opposite end of the mechanism. The two groups of plates B are reversely arranged so that the flanges of the plates 24 of one group are located at the same end of the mechanism as the flanges of the plates 25 of the other group. As shown in Figure 1, the flanges of the plates of each set overhang each other and those of the plates 24 of one group overlap one of the friction shoes of the pair at one end of the mechanism, while those of the plates 25 of the same group overhang the friction shoes at the same side of the pair at the other end of the mechanism. The plates are thus restored to normal position by the outward movement of the friction shoes through the flanges 26. As shown, the inturned flanges of the plates are spaced from the end walls of the corresponding casings to permit relative movement of the casings and plates during initial action of the mechanism. The inturned ends of the plates are spaced a proper distance from the extremities of the adjacent plates to permit the necessary full compression of the mechanism.

The friction wedge blocks D are four in number and are arranged in pairs at opposite ends of the mechanism, the blocks of each pair being disposed on opposite sides of the corresponding end sections 21 of the friction post C. Each wedge block D is provided with a flat end face 27 which directly bears upon the hollow boss 22 of the corresponding friction shell.

As clearly disclosed in Figure 5, each wedge block D is centrally cut away on the inner side, as indicated at 28, to accommodate the side portion of the corresponding end section 21 of the friction post. The cut away section 28 is provided with a vertically disposed flat friction surface 29 which cooperates with the friction surface 23 at the same side of the section 21. On the outer side, each block D has a flat wedge face 30 which cooperates with the corresponding friction shoe E.

The friction shoes E are arranged in pairs at the front and rear ends of the mechanism and cooperate with the corresponding wedge blocks D.

Each friction shoe E is provided with a flat outer friction surface 31 which cooperates with the innermost of the friction plates of the corresponding group B. At the forward end, the block E is cut away and the cut away section thereof is provided with a flat wedge face 32 which cooperates with the wedge face 30 of the corresponding wedge block D. On the inner side, the rear end portion of the friction shoe is provided with top and bottom inwardly projecting arms 33—33 which embrace the friction post and serve to guide the friction shoe longitudinally of the mechanism.

The main spring resistance comprises an inner coil and a heavier outer coil, the inner coil surrounding the central column 20 of the friction post and both coils having their opposite ends bearing directly on the inner ends of the front and rear pairs of friction shoes. By the central arrangement of the friction post and the spring resistance surrounding the same, it will be evident that the maximum amount of spring space is made available, thereby permitting the use of a spring resistance of exceptionally high capacity.

When the parts of the mechanism are assembled, the spring resistance F is placed under a substantial initial compression so that the wedge friction shoes are held apart and compensation for wear of the various friction and wedge faces will be had by the outward movement of the shoes with respect to the remaining elements of the mechanism.

The operation of my improved shock absorbing mechanism, assuming a compression stroke, is as follows: The front and rear friction casings will be moved relatively toward each other, carrying the wedge friction blocks D therewith. The latter will be forced to slide inwardly on the friction surfaces 23 of the post and will also be forced into wedging engagement with the friction shoes E, spreading the latter apart and placing the two groups of friction plates under lateral compression. During the initial inward movement of the friction wedge blocks D, there will be substantially no relative movement of the friction plates of the two groups. When the clearance between the ends of the plates and the end walls of the friction shells has been taken up and the walls of the shells directly engage the plates, the same will be moved relatively to each other, thereby increasing the frictional resistance. During the compression of the mechanism, inward movement of the front and rear sets of friction shoes with respect to each other is opposed by the main spring resistance. Due to the inwardly diverging relation of the friction surfaces of the post and the inwardly diverging relation of the opposed friction surfaces of the front and rear friction shells, a differential action will be had, thereby effecting additional compression of the main spring resistance.

The differential action is effected by the lateral separation of the friction wedge blocks D while moving on the diverging friction surfaces of the post, causing the wedge faces of the blocks D to slip on the wedge faces of the shoes E, thus forcing the shoes inwardly at a greater rate than the wedge blocks. The differential action is further augmented by the inwardly diverging relation of the friction surfaces of the friction shells. As the friction shells approach each other, the two groups of plates B will be forced laterally inwardly toward the central axis of the mechanism, thereby displacing the friction shoes inwardly also and causing additional movement of the shoes on the wedge faces of the blocks D. Inward movement of the friction shells A is finally limited by engagement of these shells with each other, thereby relieving the main spring resistance from undue compression.

The parts of the mechanism are restored to normal position when the actuating force is reduced by the expansive action of the main spring resistance F, and outward movement of the shells or casing A is limited by the retainer bolt G through the medium of the discs at the opposite ends thereof which cooperate with the bosses 22 of the front and rear friction shells.

From the preceding description, taken in connection with the drawings, it will be evident that I have provided a friction shock absorbing mechanism of the intercalated plate type which has exceptionally high capacity and differential action, wherein large frictional areas and the maximum amount of spring space for the spring resistance means is made available, thereby adding greatly to the capacity of the mechanism.

By providing the sectional friction post having removable end portions which carry the friction surfaces, the parts of the mechanism may be readily renewed when the friction surfaces of the post become worn, by substituting new end sections, thus adding greatly to the life of the gear.

While I have herein shown and described what I consider the preferred manner of carrying out my invention, the same is merely illustrative and I contemplate all changes and modifications which come within the scope of the claims appended hereto.

I claim:

1. In a friction shock absorbing mechanism, the combination with front and rear friction casings relatively movable toward and away from each other; of two groups of relatively movable intercalated friction plates, disposed at opposite sides of the mechanism and having frictional engagement with the casings, said plates being moved relatively to each other by said casings; a central friction post having friction surfaces at opposite ends thereof; friction wedge members at opposite ends of the mechanism slidable on the friction surfaces of the post; friction shoes interposed between the wedge member and the groups of plates, said shoes having sliding contact with said groups of plates and wedging engagement with the friction wedge members; and a spring resistance between the post and groups of plates surrounding and enclosing said post and yieldingly opposing relative movement of the friction shoes.

2. In a friction shock absorbing mechanism, the combination with relatively movable front and rear follower acting means, one of said follower acting means being in the form of a friction shell; of two groups of relatively movable, intercalated friction plates, disposed at opposite sides of the mechanism and having sliding frictional engagement with the friction shell; a central friction post; friction wedge means adapted to receive the actuating force, said friction wedge means being interposed between the post and plates and having frictional engagement with both the post and shell; and spring resistance means surrounding said post and disposed between the same and the friction plates, said spring resistance opposing inward movement of the friction wedge means.

3. In a friction shock absorbing mechanism, the combination with front and rear friction casings relatively movable toward and away from each other, said casings having opposed, interior, inwardly diverging friction surfaces; of a central friction post having friction surfaces at the opposite ends thereof, the friction surfaces at each end of the post being disposed on opposite sides thereof and diverging inwardly of the mechanism; two groups of relatively movable, intercalated friction plates, disposed at opposite sides of the mechanism and co-operating with the friction surfaces of the front and rear casings; a pair of wedge blocks movable with each friction casing and having frictional engagement with the friction surfaces at the corresponding end of the friction post; a pair of friction shoes at each end of the mechanism, said shoes having wedging engagement with the wedge members at the corresponding end of the mechanism and frictional engagement with the friction plates; and a main spring resistance opposing relative approach of the friction shoes at the opposite ends of the mechanism.

4. In a friction shock absorbing mechanism, the combination with front and rear friction casings relatively movable toward and away from each other, said casings having opposed, interior friction surfaces, inclined to the longitudinal axis of the mechanism; of a central friction post tapered at opposite ends, said tapered ends being provided with friction surfaces on the opposite sides thereof; two groups of relatively movable, intercalated friction plates disposed at opposite sides of the mechanism and cooperating with the friction surfaces of the friction casings; a pair of wedge blocks movable with each friction casing and having frictional engagement with the friction surfaces at the corresponding end of the friction post; a pair of friction shoes at each end of the mechanism, said shoes having wedging engagement with the wedge members at the corresponding end of the mechanism and frictional engagement with the friction plates; and spring resistance means surrounding the post opposing inward movement of the friction shoes at opposite ends of the mechanism.

5. In a friction shock absorbing mechanism, the combination with front and rear friction shells relatively movable toward and away from each other; of a central friction post comprising a central column member and enlarged end sections, said end sections being provided with friction surfaces; a group of friction plates disposed at each side of the mechanism, the plates of said groups being relatively movable by movement of said friction shells; friction wedge means at each end of the mechanism, interposed between the post and groups of plates and having engagement with the friction surfaces of the post and plates, said friction wedge elements being actuated upon movement of said shells; and a spring resistance through which said column member extends, said spring resistance yieldingly opposing movement of said friction wedge means.

6. In a friction shock absorbing mechanism, the combination with front and rear follower acting members relatively movable toward and away from each other; of two groups of relatively movable, intercalated friction plates disposed at opposite sides of the mechanism and adapted to be moved relatively to each other by said followers, means enclosing said plates resisting lateral, outward movement thereof; a central friction post; friction wedge members at one end of the post, cooperating therewith; friction shoes engaged by the friction wedge members and having frictional engagement with the friction plates; and spring resistance means surrounding said post and yieldingly opposing inward movement of the friction shoes.

7. In a friction shock absorbing mechanism, the combination with relatively movable followers; of a group of relatively movable, longitudinally disposed intercalated friction plates, said plates being bowed lengthwise in the same direction, said plates being movable relatively to each other by said followers; friction means cooperating with the plates and opposing lateral displacement thereof in one direction, said friction means being movable lengthwise of the plates; means actuated by said followers upon relative approach thereof for forcing said plates against the friction means; and means yieldingly opposing relative movement of the friction means and plates.

8. In a friction shock absorbing mechanism, the combination with front and rear follower casings; of a central friction post, including a cylindrical column member and separate end sections secured thereto, said end sections being provided with friction surfaces, a retainer bolt anchored at opposite ends to said casings to limit separation thereof, said bolt extending through the post and securing the end sections to the same; friction means within the casings cooperating with the post, including relatively movable friction elements; and coil spring resistance means surrounding said post and opposing relative movement of the friction means and post.

In witness that I claim the foregoing I have hereunto subscribed my name this 12th day of April, 1928.

JOHN F. O'CONNOR.